US007259667B2

(12) United States Patent
Sergio et al.

(10) Patent No.: US 7,259,667 B2
(45) Date of Patent: Aug. 21, 2007

(54) COMPACT PORTABLE EMERGENCY AID APPARATUS

(75) Inventors: Lolita C. Sergio, 1207 S. 8th St., Leesburg, FL (US) 34748; Donald Rogers, Wellsville, KS (US)

(73) Assignee: Lolita C. Sergio, Leesburg, FL (US)

( * ) Notice: Subject to any disclaimer, the term of this patent is extended or adjusted under 35 U.S.C. 154(b) by 177 days.

(21) Appl. No.: 11/070,395

(22) Filed: Feb. 22, 2005

(65) Prior Publication Data

US 2006/0197656 A1 Sep. 7, 2006

(51) Int. Cl.
*G08B 1/08* (2006.01)
*H04Q 7/00* (2006.01)

(52) U.S. Cl. ............................ 340/539.11; 340/539.13; 340/692; 340/573.1

(58) Field of Classification Search ........... 340/539.11, 340/539.13, 691.1, 692, 573.1, 539.12; 369/32.01, 369/34.01; 455/66, 404; 704/8; 705/3
See application file for complete search history.

(56) References Cited

U.S. PATENT DOCUMENTS 4,303,395 A 12/1981 Bower
4,583,524 A 4/1986 Hutchins
4,588,383 A 5/1986 Parker et al.
5,088,037 A 2/1992 Battaglia
5,521,812 A 5/1996 Feder et al.
5,668,954 A 9/1997 Feder et al.
5,913,685 A * 6/1999 Hutchins .................... 434/265
6,297,766 B1 * 10/2001 Koeller .................. 342/357.06

* cited by examiner

*Primary Examiner*—Toan N. Pham
(74) *Attorney, Agent, or Firm*—William M. Hobby, III

(57) ABSTRACT

A compact portable emergency aid apparatus provides audible CPR instructions in any one of a number of languages and site location of the emergency. A compact housing has a plurality of inputs and has visual and audio outputs and has a battery power supply located in the housing. A solid state memory chip, such as an EE prom, is used for digitally storing emergency instructions therein in multiple languages in a compressed format. A digital signal processor or DSP is coupled to the solid state memory chip for selecting and processing stored emergency instructions. The DSP decompresses the stored instructions and converts the instructions into an analog signal for applying it to an audio circuit. The audio circuit is connected to the audio output for receiving the retrieved audio instructions and producing them audibly through a speaker or earphone. An GPS receiver is coupled to a visual output for determining the location of an emergency. The compact nature of the apparatus allows it to be easily stored and used when an emergency situation arises.

6 Claims, 2 Drawing Sheets

COMPACT PORTABLE EMERGENCY AID APPARATUS

BACKGROUND OF THE INVENTION

The present invention relates to a compact portable emergency aid apparatus and especially to a compact device for audibly playing back CPR or other emergency instructions while providing GPS location information on the site of the emergency.

In any rescue operation, it is of importance for a rescuer to administer aid to a victim as soon as possible as well as to obtain help with the emergency as soon as possible. In a proper rescue operation, the chances of survival or recovery of the victim is greatly improved if the victim is given proper treatment in a prompt manner. To carry out a rescue operation effectively, the rescuer must follow the steps that have medical standard rescue procedures. Such standard rescue procedures are well developed in the medical field and professional rescue personnel, such as paramedics, firemen and nurses, are usually trained in the most common procedure for handling common emergencies. However, emergencies most often take place when there are no firemen, paramedics, or nurses available to perform emergency procedures, such as might be required in a CPR or trauma rescue. Furthermore, even trained personnel are frequently hammered by the chaotic circumstances in an emergency situation normally encountered in an emergency. It is also imperative in an emergency to be able to provide the exact location of the emergency so that professional personnel can get to the scene of the emergency as quickly as possible so that anyone hurt in the emergency can be properly and quickly transported to a hospital or other care facility.

The present invention is directed towards a compact-portable emergency aid apparatus which is not much larger than a typical credit card but which can give audible instructions to an untrained, as well as a trained person, performing CPR or similar emergency procedures. The audible instruction can be in a selected language for the individual having to provide the emergency procedure and the site location of the emergency can be ascertained at the same time for directing emergency personnel to the site.

In the past, there have been a number of instructional and rescue devices for emergency situations and these include the U.S. patent to Battaglia U.S. Pat. No. 5,088,037 for a portable rescue administration aid device which may be worn on a rescuer's wrist and is operative to provide sequential procedural displays of medical standard rescue steps for assisting the rescuer in carrying out the correct rescue operation. In the Feder et al. U.S. Pat. No. 5,668,954, an instructional CD player is provided for providing emergency information. The information is provided in a portable unit which may be carried to an emergency site and can provide sequential procedural displays of medical standard rescue steps for assisting the rescuer in carrying out the correct rescue operation. Similarly, in the Feder et al. U.S. Pat. No. 5,521,812, an emergency information apparatus and method provide for a portable unit which can be carried to the emergency site and provides sequential procedural displays of medical standard steps for assisting the rescuer in carrying out the correct rescue operation. A standard rescue procedure is stored in a microprocessor which can be reprogrammed as necessary.

In the Parker et al. U.S. Pat. No. 4,588,383, an interactive synthetic speech CPR trainer/prompter and method of use provides visual and synthetic speech prompts for assisting the person in a cardiopulmonary resuscitation. A plurality of actuator push buttons and indicator lamps provide synthetic voice prompts with synthetic speech instructions. The Hutchins U.S. Pat. No. 4,583,524 is a cardiopulmonary resuscitation prompting system which includes a keyboard which allows the input of information and then provides visual information to a rescuer and a loudspeaker for providing audible intelligent prompts that are reproduced phonemes originating with a speech synthesizer.

In the Bower U.S. Pat. No. 4,303,395, an emergency audible instruction apparatus for a fire extinguisher provides audible instructions for instructing a participant in handling an emergency, allowing a participant in an emergency to use both hands and eyes in treating the emergency rather than having to read the instructions.

The present invention is directed towards a very compact portable emergency aid apparatus for providing audibly CPR instructions while simultaneously providing a GPS site readout. A small sized unit stores the instructions digitally in an EEPROM chip in multiple languages and uses a digital signal processor or DPS chip for controlling the readout processing of the compressed stored information. The DSP chip decompresses the compressed data and converts the digital data to analog audio signals for application to an audio circuit for producing the audio in an earpiece or in a speaker. The small nature of the device allows it to be stored on a person when traveling or in public places where emergencies can occur and where emergency personnel may not be readily available.

SUMMARY OF THE INVENTION

A compact portable emergency aid apparatus provides audible CPR instructions in any one of a number of languages and site location of the emergency. A compact housing has a plurality of inputs and has visual and audio outputs and has a battery power supply located in the housing. A solid state memory chip, such as an EE prom, is used for digitally storing emergency instructions therein in multiple languages in a compressed format. A digital signal processor or DSP is coupled to the solid state memory chip for selecting and processing stored emergency instructions. The DSP decompresses the stored instructions and converts the instructions into an analog signal for applying it to an audio circuit. The audio circuit is connected to the audio output for receiving the retrieved audio instructions and producing them audibly through a speaker or earphone. A GPS receiver is coupled to a visual output for determining the location of an emergency. The compact nature of the apparatus allows it to be easily stored and used when an emergency situation arises.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
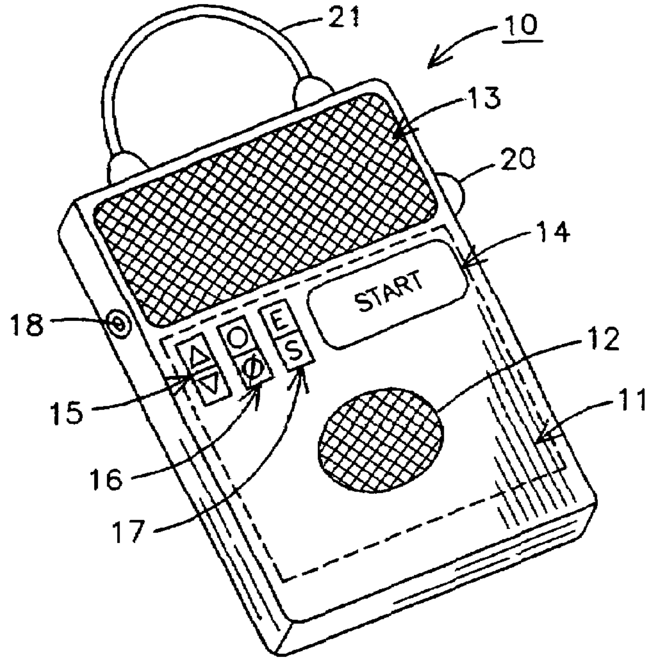
FIG. 1 is a perspective view of a compact portable emergency aid apparatus in accordance with the present invention.

Referring to the drawings and especially to FIG. 1, a compact portable emergency aid apparatus 10 is seen having a housing 11 with a speaker 12 and an LCD screen 13. The housing 10 has a start button 14 along with volume controls 15, an earphone or speaker switch 16, and language selector switches 17. An earphone jack 18 is seen on one side while an on/off switch 20 is on the other side of the housing 11. A neck strap 21 is attached to the housing and, advantageously, allows a person to have the device supported around their neck. An earphone extending from the earphone jack 18 enables a rescue operator to listen to audio instructions for CPR or other emergency procedures while they are performing their procedures using both hands and their eyes. The apparatus 10 can, advantageously, be of a small size, not much larger than a credit card, which can be easily carried on a person or kept in places where an emergency might occur. It can thereby be taken on hiking and camping trips and to remote areas for hunting, fishing and camping and can be placed in airplanes or other public places for the rapid use in emergency situations. A typical emergency situation might include audio instructions or prompts for performing CPR and is designed so the user can press a button to repeat instructions at any time. The device can be provided in a kit which may contain the written information on an instruction card with simple pictures, along with rubber gloves and a one-way valve mask for use in CPR. The rescue pack can also be used for strokes, pediatric, animal CPR and trauma.

Figure 2:
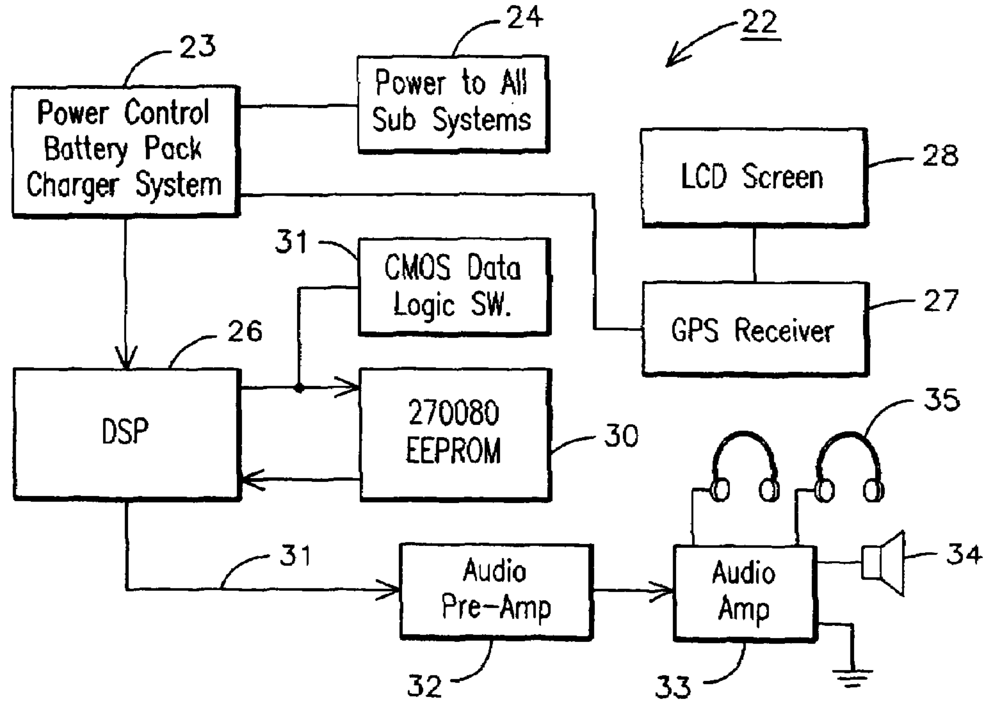
FIG. 2 is a block diagram of the compact portable emergency aid apparatus circuit.

Turning to FIG. 2, the basic operation is illustrated in the basic block diagram 22 which has a power supply 23 which includes a battery pack and which provides power to all subsystems 24 and well as through the line 25 to the digital signal processor or DSP 26. Power is also provided to the GPS receiver 27 which powers the LCD screen 28. The DSP chip 26 is connected directly to the EEPROM 30 and also through a CMOS 4040 data logic switch to the EEPROM. The DSP chip is also connected through a line 31 to an audio preamplifier 32 into an audio amplifier 33 where it is connected to a speaker 34 and to earphones 35 for providing audio instructions as stored in the EEPROM and to the audio output speakers 34. The entire circuit is controlled by the DSP chip 26 which, in this case, is a VP 1410-A manufactured by Electech Electronics while the EEPROM 30 is a 27080 chip manufactured by Atmel.

Digital signal processors are typically used to take over some of the workload from a computer or CPU to handle jobs other than the basic processing, such as the compressing or decompressing speech. The DSP generally has a multiple access memory architecture that enable the DSP to complete several accesses to a memory in an single instruction cycle. It is commonly used in signal compression and decompression and, in the present case, the DSP is used in decompressing compressed audio instructions in any one of a plurality of languages stored in the EEPROM for the recorded signal to be reproduced. Similarly, the DSP is a digital-to-analog converter for converting the decompressed digital signal from the EEPROM into an analog signal applied to the audio preamplifier, and audio amplifier to reproduce sound in the speakers 34 or the headphone 35.

The GPS receiver is a standard circuit that receives GPS signals from global positioning satellites and provides a visual showing of the latitude and longitude of a particular site on the LCD screen 28.

Figure 3:
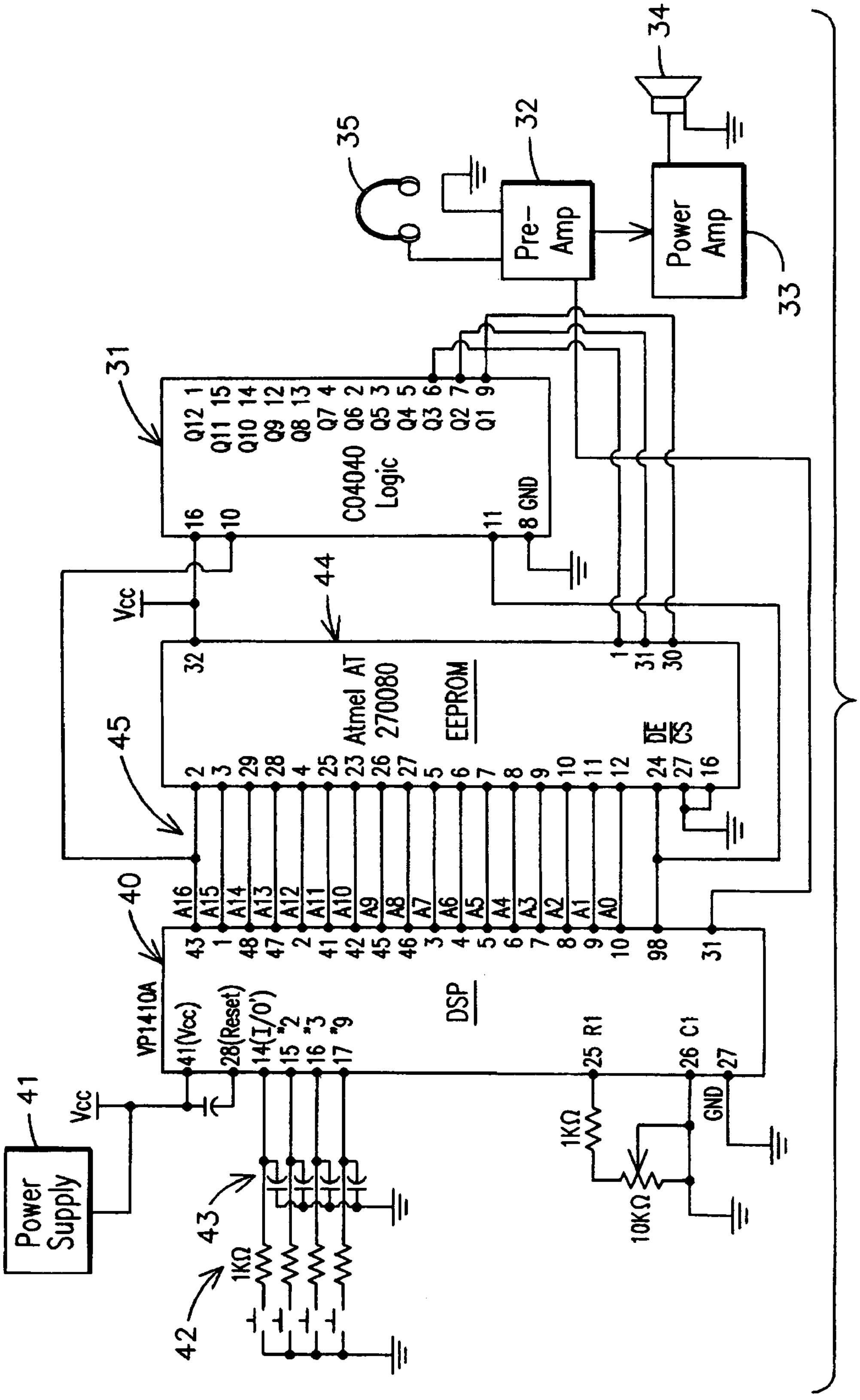
FIG. 3 is a schematic diagram of the audio instruction circuit of the present invention.

Turning now to FIG. 3, a schematic diagram of the audio instruction circuit is illustrated having a DSP chip 40 supplied with power from the power supply 41 and having a plurality of input switches 42, each connected through a 1 kilo ohm resistor 43 to the input connections of the DPS circuit 40. The EEPROM 44 has a plurality of access connections 45 to the DSP. The DSP selects the information from the EEPROM and decompresses the digitized compressed data and convert it into an audio output signal for driving the preamplifier 32 and power amplifier 33 to drive the audio speaker 34 and the headphone 35. The CMOS data logic switch 31 can be a 4040 manufactured by Motorola and is interconnected between the output of the DSP 40 and the EEPROMP 44. In operation, the instructional steps for an emergency, such as the steps for giving CPR, are digitized externally and programmed into the EEPROM 44. The DSP then responds to the program and selects the data to be presented to the audio amplifier to give audible instructions for the audio speaker.

The present compact portable emergency aid apparatus advantageously is maintained in a very small unit which can be easily packed and transmitted to remote locations and available in public places and is advantageously controlled by a DSP having a very rapid selection, and decompression of information stored in an EEPROM, which allows for the storage of a large amount of information in the instructions for a number of rescue operations and in a number of different languages and for the conversion of the compressed data into an analog signal. However, the present invention should not be construed as limited to the forms shown which are to be considered illustrative rather than restrictive.

We claim:

1. A compact portable emergency aid apparatus comprising:

a housing having a plurality of inputs and an audio output;

a battery power supply in said casing;

a solid state memory chip for storing emergency instructions therein in multiple languages;

a digital signal processor circuit coupled to said solid state memory chip for selecting and decompressing said stored emergency instructions in said memory chip in a selected language to produce an analog signal therefrom;

an audio circuit connected to said digital signal processor and to said audio output for receiving retrieved audio instructions from said digital signal processor and producing audio instruction for a selected emergency situation in a selected language; and a GPS receiver and a visual output located in said housing and coupled to said power supply for producing the location of an emergency site;

whereby audible emergency instructions can be obtained for use in emergency situations.

2. The compact portable emergency aid apparatus in accordance with claim 1 in which said digital signal processor circuit converts said decompressed data selected from said solid state memory chip to an analog signal.

3. The compact portable emergency aid apparatus in accordance with claim 2 in which said solid state memory chip is an EEPROM.

4. The compact portable emergency aid apparatus in accordance with claim 3 in which said housing has a neck strap attached thereto for a user to wear around their neck when giving emergency medical aid.

5. The compact portable emergency aid apparatus in accordance with claim 4 in which said audio circuit contains an audio pre-amplifier and power amplifier.

6. The compact portable emergency aid apparatus in accordance with claim 5 in which said solid state memory chip has stored instructions for giving CPR in Spanish and English.

* * * * *